(12) United States Patent
Meyyappan et al.

(10) Patent No.: US 7,903,915 B2
(45) Date of Patent: Mar. 8, 2011

(54) CABLE WITH INTERMEDIATE MEMBER DISCONNECTION SECTIONS

(75) Inventors: Ramaswamy Meyyappan, Katy, TX (US); Michael Alff, Sugar Land, TX (US); Arunkumar Arumugam, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/469,006

(22) Filed: May 20, 2009

(65) Prior Publication Data

US 2010/0296785 A1    Nov. 25, 2010

(51) Int. Cl.
G02B 6/44    (2006.01)
(52) U.S. Cl. .................. 385/100; 385/110; 385/113
(58) Field of Classification Search .................. 385/100
See application file for complete search history.

(56) References Cited

U.S. PATENT DOCUMENTS

| | | | |
|---|---|---|---|
| 4,721,355 A * | 1/1988 | Gould | 385/76 |
| 5,044,722 A * | 9/1991 | Voser | 385/113 |
| 5,920,672 A * | 7/1999 | White | 385/110 |
| 6,392,151 B1 * | 5/2002 | Rafie et al. | 174/106 R |
| 6,533,039 B2 | 3/2003 | Rivas et al. | |
| 6,534,986 B2 | 3/2003 | Nichols | |
| 6,888,097 B2 | 5/2005 | Batarseh | |
| 7,325,596 B2 | 2/2008 | Ebner | |
| 7,413,021 B2 | 8/2008 | Madhavan et al. | |
| 7,420,120 B2 * | 9/2008 | Vertente et al. | 174/68.1 |
| 7,458,421 B2 | 12/2008 | Barrow et al. | |
| 7,520,321 B2 | 4/2009 | Hiron et al. | |
| 2002/0172477 A1 | 11/2002 | Quinn et al. | |
| 2004/0016539 A1 | 1/2004 | Richard | |
| 2005/0006117 A1 | 1/2005 | Bertini et al. | |
| 2006/0213665 A1 | 9/2006 | Ebner | |
| 2006/0225926 A1 | 10/2006 | Madhavan et al. | |
| 2007/0131418 A1 | 6/2007 | Barrow et al. | |
| 2008/0223585 A1 | 9/2008 | Patel et al. | |
| 2008/0264630 A1 | 10/2008 | Lavrut et al. | |
| 2009/0065200 A1 | 3/2009 | Howard et al. | |

OTHER PUBLICATIONS

International Application No. PCT/US2010/035170 filed May 17, 2010 Search Report and Written Opinion completed date of Jul. 6, 2010.

* cited by examiner

*Primary Examiner* — Charlie Peng
*Assistant Examiner* — Mary A El Shammaa
(74) *Attorney, Agent, or Firm* — Edmonds & Nolte, P.C.; Brandon S. Clark; Rodney V. Warfford

(57) ABSTRACT

A cable is provided including an inner member, an outer member and an intermediate member. The intermediate member may be positioned between the inner member and the outer member and include a number of disconnection sections spaced apart from one another. In some cases, the cable may include two or more inner members. In addition, a method for preparing an end of a cable may be provided, including the steps of removing a portion of an outer member of the cable and applying a tensile force to an intermediate member of the cable comprising a plurality of disconnection sections. The intermediate member of the cable may be sheared at one of the plurality of disconnection sections, thereby exposing a portion of an inner member of the cable.

16 Claims, 5 Drawing Sheets

CABLE WITH INTERMEDIATE MEMBER DISCONNECTION SECTIONS

BACKGROUND

1. Field of the Invention

Embodiments of the present invention may be generally related to, but not limited to, cable composition and more specifically to cable compositions configured so as to ease field modification. However, aspects of the invention may be used in many situations and circumstances beyond this exemplary field.

2. Description of the Related Art

The following descriptions and examples are not admitted to be prior art by virtue of their inclusion in this section.

Cables, such as instrumentation or power cables, may be used in an assortment of industries and have a variety of shapes and configurations. For example, the cable may comprise an outer protection layer (i.e., jacket), an inner core, and an intermediate filler material (i.e., filler). This type of configuration may provide protection to the core of the cable with respect to the surrounding environment or the handling of the jacket. In some cases, the jacket may be harder and more robust than the core. The filler material may fill the gap between the core and the jacket and may provide stability during vibration and shock applied to the cable. Due to their ability to transmit power and information, some cables may be exposed to a wide variety of environmental conditions and applications. For example, cables may be run downhole to provide communication or power to a downhole well tool or sensor.

Downhole, a cable may be exposed to a harsh environment of high pressure, high temperature, and high loading conditions. In addition, there may be situations in which it is necessary to connect the cable to a tool or sensor, or splice a cable in order to feed one end or another through a passageway, such as passageways that may be located in a packer for example. Once cut, the inner core may be vulnerable to exposure along the joints and splices, after the cable is run downhole. In order to minimize this potential vulnerability, accurate and simple preparation of the cable ends is required. End preparations may require the filler to be removed from the end of the cable in order to either expose the inner core or expose the area between the inner core and the jacket. However, such operations may need to be performed in the field at a great cost and with the potential to damage the inner core or other parts of the cable.

SUMMARY

In accordance with one embodiment of the invention, a cable may comprise an outer member, an inner member, and an intermediate member. The intermediate member may be positioned between the outer member and the inner member. In addition, the intermediate member may comprise a plurality of disconnection sections spaced apart from one another.

In accordance with another embodiment of the invention, a method for preparing an end of a cable may comprise the steps of removing a portion of an outer member of the cable and applying a tensile force to an intermediate member of the cable comprising a plurality of disconnection sections. Thereby shearing the intermediate member at one of the plurality of disconnection sections and exposing a portion of the inner member of the cable.

Other or alternative features will become apparent from the following description, from the drawings, and from the claims.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of the various described technologies. The drawings are as follows.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible. In the specification and appended claims: the terms "connect", "connection", "connected", "in connection with", "connecting", "couple", "coupled", "coupled with", and "coupling" are used to mean "in direct connection with" or "in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Figure 1:
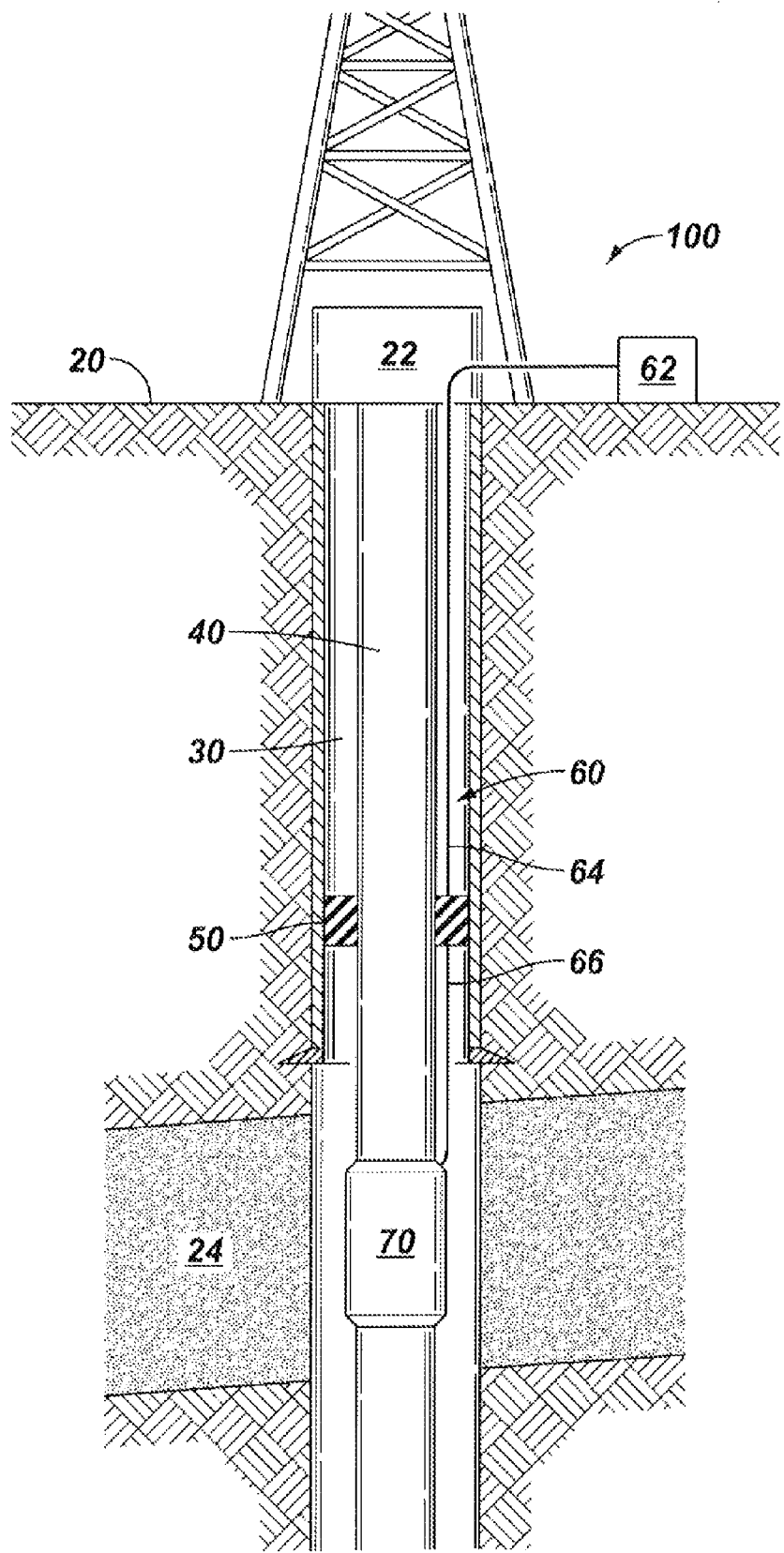
FIG. 1 is a schematic representation of a well system comprising a cable deployed downhole, according to an embodiment of the present invention.

Referring generally to FIG. 1, a well system 100 may be provided to produced desirable fluids, such as hydrocarbons for example, from a reservoir 24 located below the surface 20 of the earth. In order to reach the reservoir 24, a typical well system 100 may comprise a well bore 30 extending from the surface 20 to the reservoir 24. The well bore 30 may not be limited to the substantially vertical well bore 30 shown in the illustrative embodiment and may include deviated or multi-lateral well bores, among other configurations. The surface 20 (e.g., either terrestrial or sub-sea), may include a well head 22 provided at the top of the well bore 30. The well head 22 may be coupled with production tubing 40 run into the well bore 30 and used to direct fluids to or from the reservoir 24. The annulus between the tubing 40 and the wall of the well bore 30 (e.g., either casing or open bore hole), may be sealed with a packer 50 for stabilizing the tubing 40 or for directing the fluid through the interior of the tubing 40.

A cable 60, in accordance with an embodiment of the claimed invention, may include an upper cable section 64 and a lower cable section 66. The upper cable section 64 may be coupled with a surface station 62 or other type of device. The lower cable section 66 may be coupled with a downhole device 70 such as a tool (e.g., a valve, packer, or isolation device, among others), a sensor (e.g., temperature, pressure, water cut, flow rate, among others), or various combinations of tools and sensors. In some cases, the cable 60 may be used to transfer communication and/or power between the downhole device 70 and another component, such as the surface station 62 in some embodiments. In other cases, the cable 60 may be used as a portion of a larger communication/transmission system to link other cables, systems, networks, or devices together.

As shown in this example, packer 50 may functionally seal the annulus between the tubing 40 and the interior circumference of the well bore 30. Accordingly, the cable 60 may have to be split into the upper cable section 64 and the lower cable section 66 in order to route the cable 60 through a pass through or conduit located in the packer 50. Once routed through the device for example, the upper cable section 64 may be spliced back together with the lower cable section 66. One or both of the splitting and splicing operations may be done at a field location while the production tubing 40 is being run into the well bore 30. Since rig time is relatively expensive and the reliability of the splice essential to ensure proper functioning of the downhole device 70, rapid and precise preparation of the cable ends may be required for successful and efficient splitting and splicing operations.

Figure 2A:
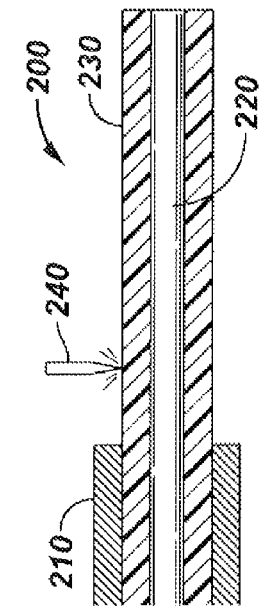
FIG. 2A is a cross-sectional side view of the steps of a prior art method to expose a portion of the inner core of an end of a cable located outside of a jacket.
Figure 2A:
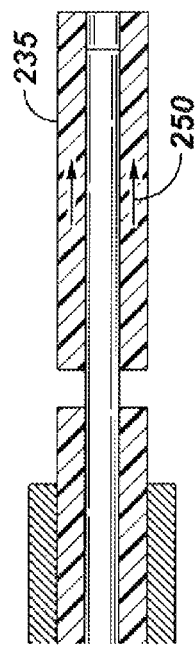
Figure 2A:
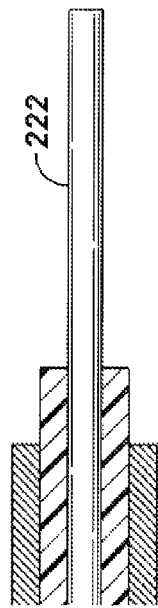
Figure 2B:
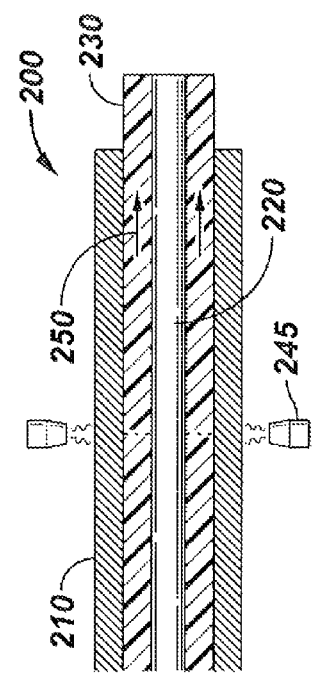
FIG. 2B is a cross-sectional side view of the steps of a prior art method to expose a portion of the inner core of an end of a cable located within a jacket.
Figure 2B:
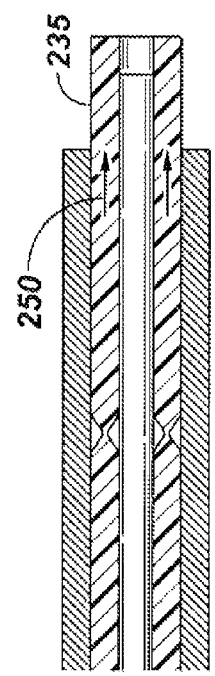
Figure 2B:
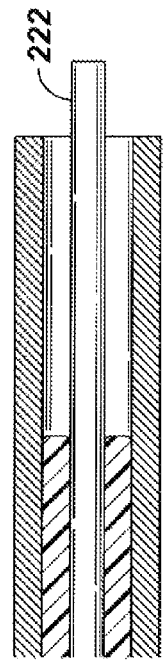

Turning generally to FIGS. 2A and 2B, a cable 200 may comprise a jacket 210, core 220 and filler 230. After a cable 200 is cut, two general forms of cable end preparation may typically be used in preparing a cut end of a cable 200 for connection to another cable 200 or device. One general form results in a bare portion of the core 222 extending beyond both of the filler 230 and jacket 210, such as shown in FIG. 2A. In order to produce a cable end in which the bare portion of the core 222 is exposed outside of the jacket 210, a section of the jacket 210 longer than the ultimately desired length of bare core 222 may be removed from the cut end of the cable 200 (the results of which are shown at the top of the figure). As a result, the filler 230 and core 220 both extend beyond the remaining jacket 210 material. A preparation device 240 (such as a cutting or heating instrument) may then be applied to the filler 230 at the desired length of the bare portion of the core 222. The preparation device 240 may create a removable portion of the filler 235, separate from the rest of the filler 230. If a cutting instrument is used, the depth of the cut may be to the outer circumference of the core 220.

Once the filler 230 is sectioned, or even while the filler 230 is being sectioned (such as when heat is used as a preparation device 240), a tensile force 250 may be applied to the portion of the filler 235. The tensile force 250 may cause the portion of the filler 235 to translate relative to the core, thereby removing it from the core 220 and the remaining cable 200 components. The removal of the portion of the filler 235 may expose a bare portion of the core 222. The bare portion of the core 222 may then be ready for further processing (e.g., splicing with another end, coupling with a sensor device, among others). In some cases, depending upon where the section is made, a section of the filler 230 may extend beyond the jacket 210, while in other cases, the filler 230 may only extend to the end of the jacket 210.

Another general form of cable end preparation involves removing the filler 230 from between the core 220 and jacket 210. (See FIG. 2B) This form creates a space between at least part of the bare portion of the core 222 and the surrounding jacket 210. This space may provide access for many different types of operations, including cable sealing assemblies that may require that protection or some portion of a splicing device, for example, be placed inside of the cable jacket 210 and around the core 220. Another example is when a spacer needs to be seated inside of the cable jacket 210 in order to centralize the core 220. In order to produce this form of cable end preparation in which at least a portion of the bare portion of the core 222 is provided within the jacket 210 (i.e., at least some of the portion of filler 235 is removed from between the jacket 210 and core 220), a section of the jacket 210 may initially be removed from the cable 200 that is smaller than the desired length of bare portion of the core 220 (the results of which are shown at the top of the figure). In this case, a sectioning device 245, such as a heating instrument, may be applied through the jacket 210 to weaken a section of the filler 230. While applying the preparation device 245, a tensile force 250 may be applied to the end of the filler 230, separating a portion of the filler 235 from the rest of the cable 200. As the portion of the filler 235 is removed from the cable 200, a bare portion of the core 222 may be provided within the jacket 210 of the cable end.

Figure 3A:
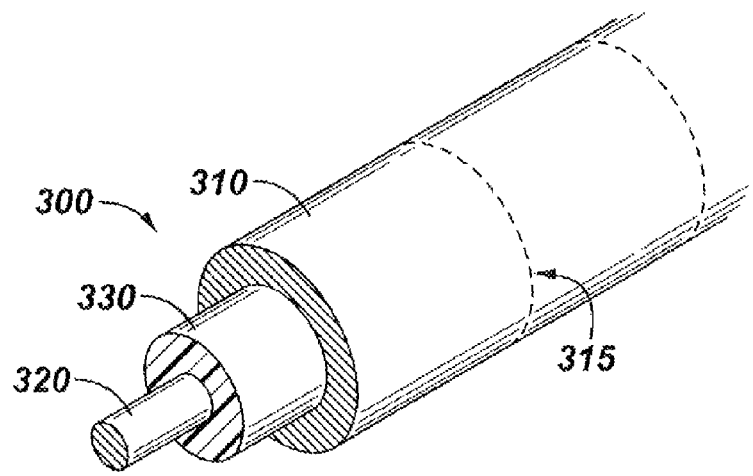
FIG. 3A is a front perspective view of an end of a cable, in accordance with an embodiment of the invention.
Figure 3B:
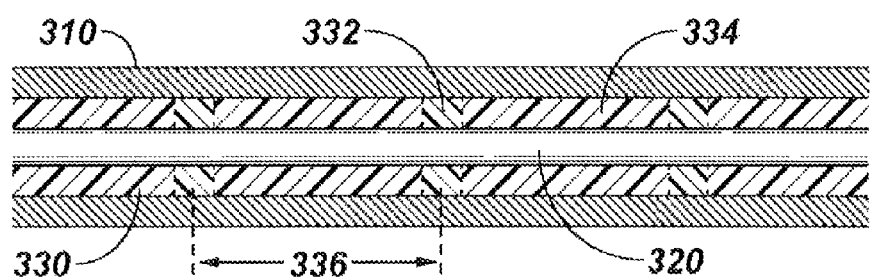
FIG. 3B is a cross-sectional side view of a section of the cable shown in FIG. 3A.

Turning now to FIGS. 3A and 3B, these drawings illustrate an embodiment configured according to aspects of the present invention. A cable 300 may comprise an inner member 320 (e.g., such as an electrically conductive core or fiber optic cable, among others), an outer member 310 (e.g., such as a jacket or protective coating, in some cases a metal, such as stainless steel or inconel, among others), and an intermediate member 330 (e.g., plastics, Teflon, or other material) provided between the inner member 320 and the outer member 310. The intermediate member 330 may comprise a plurality of sectioning sections 332 in which each of the sectioning section 332 has a lower functional tensile strength than the surrounding or non-sectioning sections 334 of the intermediate member 330. The tensile strength of each of the sectioning sections 332 may be reduced through a variety of methods, including, but not limited to, perforation, scoring, cutting, reductions in diameter or thickness, material composition, manufacturing processes such as heating of the sectioning sections 332, among other methods.

The sectioning sections 332 may be relatively evenly spaced, but embodiments of the present invention may not be limited to evenly spaced sectioning sections 332. As shown in FIG. 3B, each sectioning section 332 may be separated by a sectioning interval 336. In some embodiments, the sectioning interval 336 may be indicated on the outer member 315, such as with markings or variations in outer circumference, for example. The use of substantially evenly distributed sectioning intervals 336 may allow an operator to predict or otherwise determine the location of a sectioning section 332 within an outer member 310 of a cable 300, for example, based on the location of a visible or detectable sectioning section 332. In other words, after cutting a cable 300, an end portion of the intermediate member 330 may be exposed and removed. The separation point of the intermediate member 330 may provide a reference point for determining where the next sectioning section 332 is located. With this information, the preparation of the end of the cable may be more precisely performed.

Figure 4:
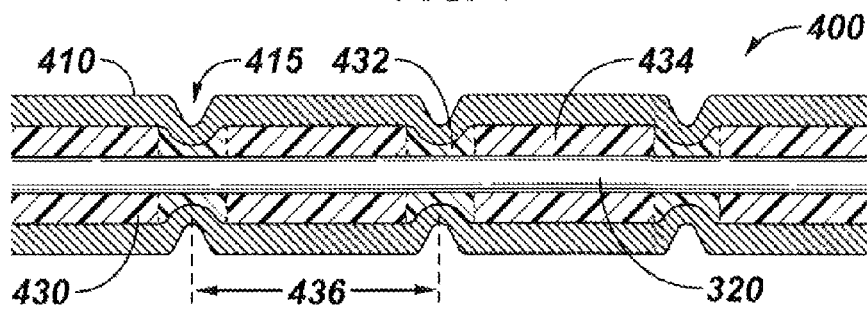
FIG. 4 is a cross-sectional side view of a section of a cable in accordance with another embodiment of the invention.

Referring generally to FIG. 4, this drawing illustrates another exemplary embodiment of aspects of the present invention. In this case, a cable 400 may comprise an inner member 320, an outer member 410, and an intermediate member 430. During manufacturing, sectioning sections 432 may be created by reducing the relative external diameter of the intermediate member 430 as compared to the external diameters of non-sectioning sections 434 of the intermediate member 430. As shown in the embodiment, the outer circumference of the outer member 410 may comprise a series of grooves or indentations 415 (either continuous or discontinuous about the circumference of the cable 400). Since the outer member 410 may be a relatively harder or more robust material than the intermediate member 430, the layer thickness of the outer member 410 may remain relatively unaffected by the indentations 415.

Accordingly, the indentation process may then result in variations in the intermediate member 430, reducing the tensile strength and creating sectioning sections 432 while the tensile strength of the outer member 410 may be relatively unchanged. In addition, the indentations 415 may provide a marking of the sectioning intervals 436 of the sectioning sections 432, thereby facilitating the proper sectioning of the intermediate member 430. In this illustrative embodiment, the inner member 320 may be relatively unaffected by compressive stress, such as may be the case when the inner member 320 is an electrical conduit.

Figure 5:
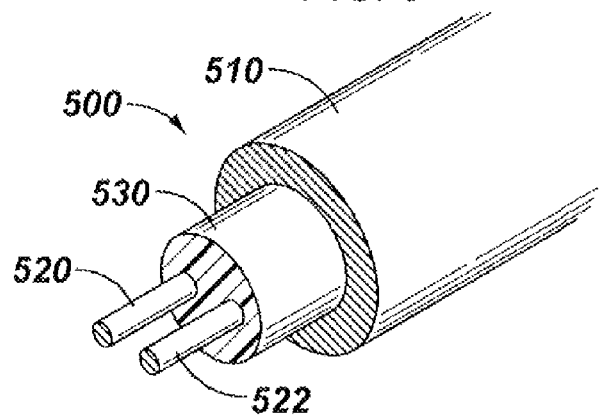
FIG. 5 is a front perspective view of an end of a cable in accordance with another embodiment of the invention.

Turning now to FIG. 5, another exemplary embodiment of aspects of the present invention is shown in this drawing. In this embodiment, a cable 500 may comprise an outer member 510, an intermediate member 530, and two or more inner members 520 and 522. The inner members 520 and 522 may be different materials, such as an electrical conduit and a fiber optic line. In some cases, the inner members 520 and 522 may be the same material, such as two or more fiber optic lines. As shown, the inner members 520 and 522 may be surrounded by a single intermediate member 530. Since the tensile force required to remove a section of the intermediate member 530 may increase with an increase in the number of inner members 520, 522, a coating may be applied to the outer circumference of each of the inner members 520, 522 as well as to the inner circumference of the outer member 510 in order to facilitate the removal of a portion of the intermediate member 530.

Figure 6:
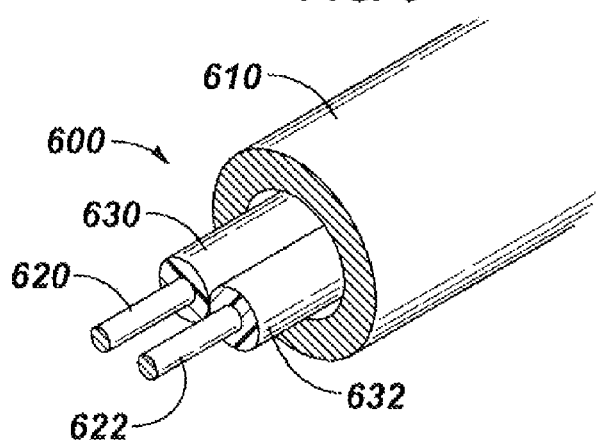
FIG. 6 is a front perspective view of an end of a cable in accordance with another embodiment of the invention.

Referring generally to FIG. 6, this drawing shows another illustrative embodiment of aspects of the present invention. In this embodiment, a cable 600 may comprise an outer member 610, two or more inner members 620, 622, and two or more corresponding intermediate members 630, 632. As shown, one intermediate member 630, 632 may respectively surround one inner member 620, 622. The combination of intermediate and inner members 630, 620 and 632, 622, may in turn be surrounded by a relatively uniform thickness outer member 610. In some cases, inner member 620 may be the same as inner member 622 and intermediate member 630 may be the same as intermediate member 632. However, embodiments of the invention may not be limited to this illustrative example. Various combinations of materials may be used for the inner members 620, 622 and intermediate members 630, 632. For example, inner member 622 may be different than inner member 620 and intermediate member 630 may be different than intermediate member 632. Additionally, the combination 630, 620 may be different than combination 632, 622.

Figure 7:
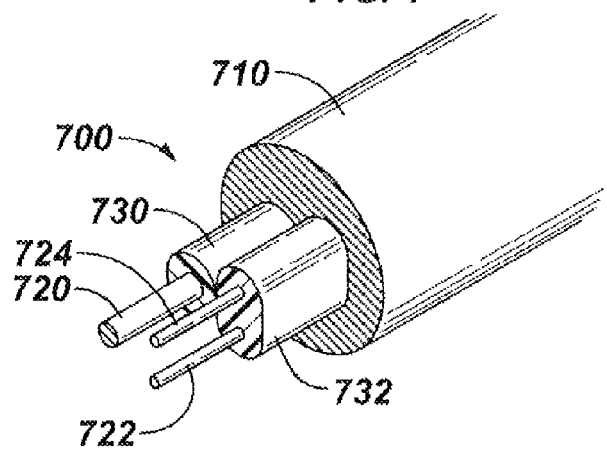
FIG. 7 is a front perspective view of an end of a cable in accordance with another embodiment of the invention.

Turning now to FIG. 7, another exemplary embodiment according to aspects of the present invention is shown in this drawing. As shown, a cable 700 may comprise an outer member 710, two or more intermediate members 730 and 732 surrounding one or two or more inner members 720, 722, and 724. As with the previous example, the intermediate member 730 may be the same as or different than the other intermediate member 732. In addition, the outer member 710 is shown as not having a relatively uniform wall thickness and may be configured so as to provide a relatively consistent outer circumference. For example, this embodiment may comprise a hybrid type of cable including an electrical conductor 720 and two or more fiber optic lines 722, 724.

Figure 8A:
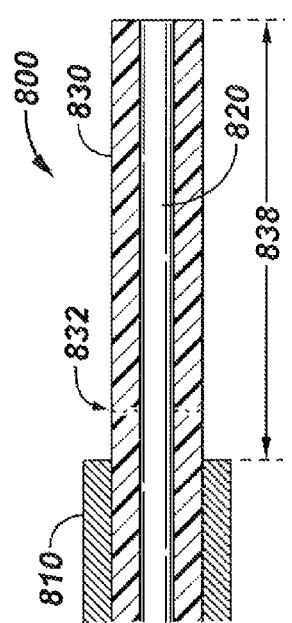
FIGS. 8A to 8C are cross-sectional side views of an end of a cable illustrating a method for exposing a portion of an inner member in which the portion is located outside of the outer member, in accordance with an embodiment of the invention.
Figure 8B:
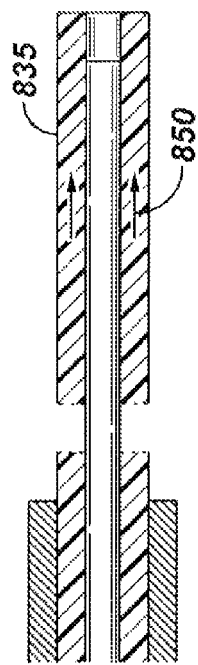
Figure 8C:
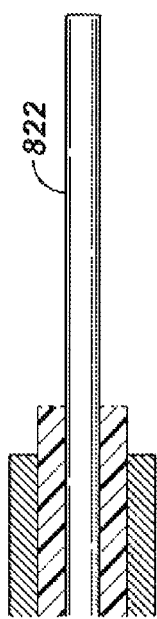

Referring generally to FIGS. 8A to 8C, these drawings illustrate steps in an illustrative embodiment of a method for preparing a cable end. After a cable 800 is cut, a portion of the outer member 810 is removed, resulting in the exposure of a length 838 of intermediate member 830 and inner member 820, as shown in FIG. 8A. The length 838 may be equal to or longer than a sectioning interval (not shown) so that a sectioning section 832 is exposed. A tensile force 850 is applied to the end of the intermediate member 830, causing it to separate into a removable section 835 at the sectioning section 832. At this point, the location of the sectioning section 832 may be accurately identified. The removable section 835 is removed from the cable end, exposing a portion of the inner member 822. In some cases, the cable end may now be coupled to a splice or device.

However, in other cases, the length of the portion of exposed inner member 822 and/or the length of the intermediate member 830 extending from the end of the outer member 810 (if any) may be more significant. In these cases, the earlier steps of the method may be repeated with the benefit of more precisely predicting the accurate location of the next sectioning section 832, if the sectioning sections 832 are provided at uniform intervals. The length of exposed intermediate member 830 and the length of the portion of the inner member 822 may then be adjusted accordingly so as to satisfy whichever dimensions are considered significant. For example, the length 838 of the outer member 810 may be measured from the exposed sectioning section 832, resulting in a predictable length of the intermediate member 830 extending beyond the outer member 810 and a predictable length of the inner member 820 extending beyond the outer member 810 and the intermediate member 830.

Figure 9A:
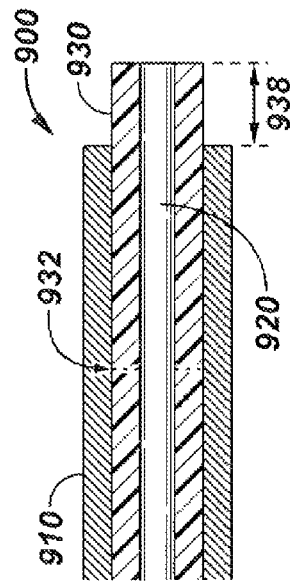
FIGS. 9A to 9C are cross-sectional side views of a cable illustrating a method for exposing a portion of an inner member in which the portion is located within the outer member, in accordance with an embodiment of the invention.
Figure 9B:
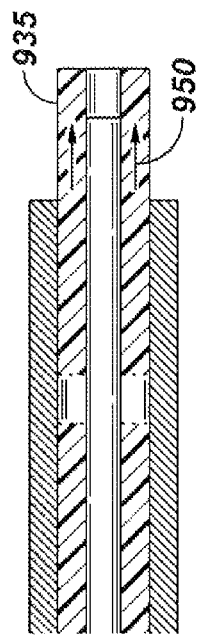
Figure 9C:
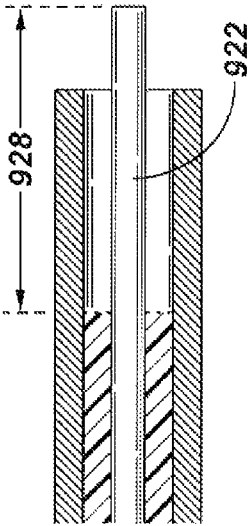

Turning now to FIGS. 9A to 9C, an embodiment of a method of preparing a cable end is shown in these drawings. After a cable 900 is cut, a portion of the outer member 910 may be removed, resulting in the exposure of a length 938 of a combination of intermediate member 930 and inner member 920, as shown in FIG. 9A. In this exemplary method, the length 938 of the exposed combination of intermediate member 930 and inner member 920 is less than the length of a sectioning interval (not shown) so that the sectioning section 932 is within the un-removed portion of the outer member 910. As a result, when a force 950 is applied to the exposed end of the intermediate member 930, the intermediate member 930 separates within the outer member 910. A portion of the intermediate member 935 may then be removed from the cable end, such that at least a portion of the exposed inner member 922 is located within the outer member 910. The length 928 of the exposed inner member 922 located within the outer member 910 may be a critical or significant dimension, depending upon the application and the configuration of any connecting components. However, the method may be modified by determining the location of the sectioning sections 932 after the cable 900 is initially cut, as previously described. The location of the sectioning section 932 combined with a relatively uniform sectioning interval (not shown) can be used to more accurately configure the length 928 of the exposed portion of the inner core 922 located within the outer member 910.

While the invention has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A cable, comprising:
    an inner member;
    an outer member;
    an intermediate member positioned between the inner member and the outer member; and
    a plurality of disconnection sections axially spaced apart from one another, wherein the plurality of disconnection sections are disposed within the intermediate member.
2. The cable as recited in claim 1, wherein the plurality of disconnection sections are areas of reduced shear strength relative to remaining sections of the intermediate member.
3. The cable as recited in claim 1, wherein the plurality of disconnection sections comprise perforations.
4. The cable as recited in claim 1, wherein the plurality of disconnection sections comprise areas of reduced diameter relative to remaining sections of the intermediate member.
5. The cable as recited in claim 1, wherein the inner member is an electrical conduit.
6. The cable as recited in claim 1, wherein the inner member is a fiber optic line.
7. The cable as recited in claim 1, wherein the outer member is a metallic jacket.
8. The cable as recited in claim 1, wherein the outer member comprises indicators representing spacing of the plurality of disconnection sections.
9. The cable as recited in claim 1, wherein at least one of the inner member or the outer member comprises secondary disconnection sections.
10. The cable as recited in claim 1, wherein the cable comprises two or more inner members.
11. The cable as recited in claim 10, wherein at least two of the two or more inner members are surrounded by individual intermediate members.
12. A cable comprising:
    an outer member;
    two or more inner members;
    at least one intermediate member provided between the two or more inner members and the outer member;
    a plurality of disconnection sections axially spaced apart from one another, wherein the plurality of disconnection sections are disposed within the intermediate member.
13. The cable as recited in claim 12, wherein at least one of the two or more inner members is an electrical conduit.
14. The cable as recited in claim 12, wherein at least one or the two or more inner members is a fiber optic line.
15. The cable as recited in claim 12, wherein each of the two or more inner members is contained within an intermediate member comprising a plurality of disconnection sections axially spaced apart from one another.
16. The cable as recited in claim 12, wherein the plurality of disconnection sections are areas of reduced shear strength relative to remaining sections of the intermediate member.

* * * * *